(12) United States Patent
Mahabadi et al.

(10) Patent No.: US 10,407,034 B2
(45) Date of Patent: Sep. 10, 2019

(54) COMBINED SLIP-BASED DRIVER COMMAND INTERPRETER

(71) Applicant: GM GLOBAL TECHNOLOGY OPERATIONS LLC, Detroit, MI (US)

(72) Inventors: Seyedalireza Kasaiezadeh Mahabadi, Shelby Township, MI (US); James H. Holbrook, Fenton, MI (US); Hualin Tan, Novi, MI (US); Ehsan Hashemi, Waterloo (CA); Bakhtiar B. Litkouhi, Washington, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 226 days.

(21) Appl. No.: 15/614,172

(22) Filed: Jun. 5, 2017

(65) Prior Publication Data

US 2018/0347486 A1    Dec. 6, 2018

(51) Int. Cl.
| | | |
|---|---|---|
| *B60T 8/175* | (2006.01) | |
| *F02P 5/04* | (2006.01) | |
| *F02P 5/14* | (2006.01) | |
| *F02P 5/15* | (2006.01) | |
| *B60K 28/16* | (2006.01) | |
| *B60T 8/1755* | (2006.01) | |
| *B60W 50/00* | (2006.01) | |
| *B60W 50/10* | (2012.01) | |

(52) U.S. Cl.
CPC ............ *B60T 8/175* (2013.01); *B60K 28/16* (2013.01); *B60T 8/1755* (2013.01); *B60W 50/0098* (2013.01); *B60W 50/10* (2013.01); *F02P 5/04* (2013.01); *F02P 5/142* (2013.01); *F02P 5/1504* (2013.01); *B60T 2270/304* (2013.01); *B60T 2270/86* (2013.01); *B60W 2050/0031* (2013.01); *B60W 2050/0062* (2013.01); *B60W 2520/10* (2013.01); *B60W 2540/10* (2013.01); *B60W 2540/12* (2013.01); *B60W 2540/18* (2013.01)

(58) Field of Classification Search
CPC ....... F02D 41/0087; F02P 5/04; F02P 5/1504; F02P 5/142; B60T 8/175; B60K 28/16
See application file for complete search history.

(56) References Cited

U.S. PATENT DOCUMENTS

| | | | |
|---|---|---|---|
| 5,247,466 A * | 9/1993 | Shimada | B60T 8/172 701/1 |
| 5,369,580 A * | 11/1994 | Monji | B60T 8/17551 180/282 |
| 5,746,486 A | 5/1998 | Paul et al. | |

(Continued)

*Primary Examiner* — Ramsey Refai
(74) *Attorney, Agent, or Firm* — Lorenz & Kopf LLP (57) ABSTRACT

A combined slip based driver command interpreter for a vehicle is provided which may be communicatively coupled to a steering wheel angle sensor, an acceleration pedal position sensor and a brake pedal position sensor, the combined slip based driver command interpreter including, but not limited to a memory configured to store a non-linear combined lateral slip model and a non-linear combined longitudinal slip model, and a processor, the processor configured to determine a driver's intended vehicle lateral velocity and a driver's intended vehicle yaw rate based upon the angle of the steering wheel, the position of the acceleration pedal, the position of the brake pedal, a longitudinal velocity of the vehicle, the non-linear combined lateral slip model and the non-linear combined longitudinal slip model.

20 Claims, 5 Drawing Sheets

(56) References Cited

U.S. PATENT DOCUMENTS

| | | | |
|---|---|---|---|
| 5,782,543 A * | 7/1998 | Monzaki | B60T 8/1755 180/197 |
| 5,878,357 A * | 3/1999 | Sivashankar | B60T 8/172 303/140 |
| 5,941,919 A | 8/1999 | Pastor et al. | |
| 6,209,972 B1 * | 4/2001 | Matsuno | B60T 8/1755 303/140 |
| 6,325,469 B1 | 12/2001 | Carson et al. | |
| 6,658,342 B1 | 12/2003 | Hac | |
| 7,269,493 B2 * | 9/2007 | Uemura | B60T 8/17557 340/436 |
| 7,555,367 B2 * | 6/2009 | Kuge | B60T 8/17551 340/436 |
| 8,073,607 B2 | 12/2011 | Sidlosky et al. | |
| 2003/0195684 A1 * | 10/2003 | Martens | B60K 28/16 701/41 |
| 2005/0125131 A1 * | 6/2005 | Kato | B60T 8/172 701/70 |
| 2005/0278107 A1 * | 12/2005 | Disser | B60T 8/1755 701/76 |
| 2008/0208406 A1 | 8/2008 | Chen et al. | |
| 2012/0109458 A1 * | 5/2012 | Sidlosky | B60G 17/02 701/41 |

\* cited by examiner

COMBINED SLIP-BASED DRIVER COMMAND INTERPRETER

INTRODUCTION

The present invention generally relates to vehicles, and more particularly relates to interpreting driver input to a vehicle.

Vehicles often utilize electronic stability control systems to improve a vehicle's stability by predicting, detecting and reducing loss of traction. However, in performance situations, electronic stability control systems are often viewed as inaccurate by drivers and are thereby often manually turned off in those performance situations. In other words, the electronic stability control system may activate well before the vehicle reaches an actual physical limit of the vehicle, thereby reducing the performance of the vehicle without substantially increasing the safety of the vehicle leading to drivers turning off the safety system in certain performance situations.

Accordingly, it is desirable to improve the input to electronic stability control systems and other systems in a vehicle to more accurately capture a driver's intent in performance situations. Furthermore, other desirable features and characteristics of the present invention will become apparent from the subsequent detailed description of the invention and the appended claims, taken in conjunction with the accompanying drawings and the background of the invention.

SUMMARY

In one embodiment, for example, a vehicle is provided. The vehicle may include, but is not limited to, a steering wheel configured to steer the vehicle, a steering wheel angle sensor configured to output an angle of the steering wheel, an acceleration pedal configured to control a fuel supply rate of the vehicle, an acceleration pedal position sensor configured to output a position of the acceleration pedal, a brake pedal configured to control braking of the vehicle, a brake pedal position sensor configured to output a position of the brake pedal, and a combined slip based driver command interpreter communicatively coupled to the steering wheel angle sensor, the acceleration pedal position sensor and the brake pedal position sensor, the combined slip based driver command interpreter including, but not limited to a memory configured to store a non-linear combined lateral slip model and a non-linear combined longitudinal slip model, and a processor, the processor configured to determine a driver's intended vehicle lateral velocity and a driver's intended vehicle yaw rate based upon the angle of the steering wheel, the position of the acceleration pedal, the position of the brake pedal, a longitudinal velocity of the vehicle, the non-linear combined lateral slip model and the non-linear combined longitudinal slip model.

In another embodiment, for example, a method for operating a combined slip based driver command interpreter for a vehicle is provided. The method may include, but is not limited to, receiving, by a processor of the combined slip based driver command interpreter, a steering wheel angle of a steering wheel of the vehicle, a position of a brake pedal of the vehicle and a position of an acceleration pedal of the vehicle, and determining, by the processor, a driver's intended vehicle lateral velocity and a driver's intended vehicle yaw rate based upon the angle of the steering wheel, the position of the acceleration pedal, the position of the brake pedal, a non-linear combined lateral slip model and a non-linear combined longitudinal slip model.

In yet another embodiment, for example, a combined slip based driver command interpreter for a vehicle is provided. The combined slip based driver command interpreter may include, but is not limited to, a memory configured to store a non-linear combined lateral slip model and a non-linear combined longitudinal slip model, and a processor communicatively coupled to the memory, the processor configured to receive a steering wheel angle from a steering wheel angle sensor, an acceleration pedal position from an acceleration pedal position sensor and a brake pedal position from a brake pedal position sensor, and determine a driver's intended vehicle lateral velocity and a driver's intended vehicle yaw rate based upon the angle of the steering wheel, the position of the acceleration pedal, the position of the brake pedal, the non-linear combined lateral slip model and the non-linear combined longitudinal slip model.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
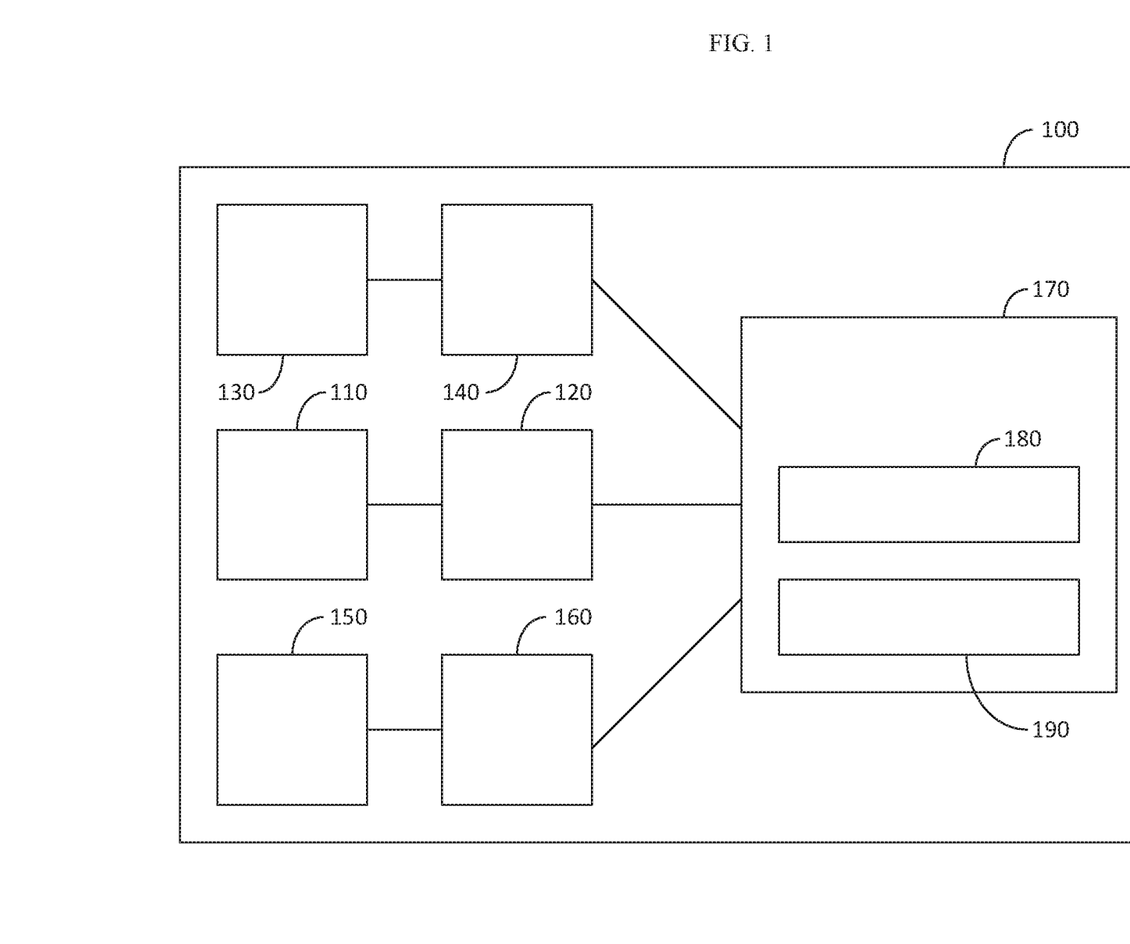
FIG. 1 is a block diagram of a vehicle, in accordance with an embodiment.

FIG. 1 is a block diagram of a vehicle 100, in accordance with an embodiment. The vehicle may be, for example, an automobile. The vehicle 100 includes a steering wheel 110 arranged to steer the vehicle 100. The vehicle 100 further includes a steering wheel angle sensor 120. The steering wheel angle sensor 120 is coupled to the steering wheel 110 and outputs an angle of the steering wheel 110 as the driver of the vehicle 100 rotates or otherwise moves the steering wheel 110. As discussed in further detail below, the angle of the steering wheel is used to determine a driver's intent. In other words, the angle of the steering wheel is used to determine how the driver wants the vehicle 100 to react.

The vehicle 100 includes an acceleration pedal 130 arranged to control a fuel supply rate to an engine (not illustrated) of the vehicle 100. The vehicle 100 further includes an acceleration pedal position sensor 140. The acceleration pedal position sensor 140 is coupled to the acceleration pedal 130 and outputs the position of the acceleration pedal 130 as the driver presses or releases the acceleration pedal 130. As discussed in further detail below, the position of the acceleration pedal 130 is used to determine a driver's intent.

The vehicle 100 includes a brake pedal 150 arranged to control a brake system (not illustrated) of the vehicle 100.

The vehicle 100 further includes a brake pedal position sensor 160. The brake pedal position sensor 160 is coupled to the brake pedal 150 and outputs the position of the brake pedal 150 as the driver presses or releases the brake pedal 150. As discussed in further detail below, the position of the brake pedal 150 is used to determine a driver's intent.

The vehicle 100 further includes a combined slip-based driver command interpreter (CSBDCI) 170. The CSBDCI 170 receives data from the steering wheel angle sensor 120, the acceleration pedal position sensor 140 and the brake pedal position sensor 160 and longitudinal speed (from, for example, an estimator such as a global positioning system (GPS), not illustrated, or any direct velocity measurement system) and analyzes the data to interpret the driver's intent.

The CSBDCI 170 includes a processor 180 and a memory 190. The processor 180 may be a central processing unit (CPU), an application specific integrated circuit (ASIC), a field programmable gate array (FPGA), a microcontroller or any other logic device or combination thereof. The processor 180 may be dedicated to the CSBDCI 170 or may be shared with one or more other systems in the vehicle 100. The memory 190 may be any combination of volatile and non-volatile memory. The memory may store non-transitory computer-readable instructions for implementing the CSBDCI 170, as discussed in further detail below.

One benefit of the CSBDCI 170, for example, is that the CSBDCI 170 can accurately determine a driver's intent in performance situations. For example, when a driver is attempting to negotiate a corner quickly, the driver may use the acceleration pedal 130 to accelerate through the corner. The driver could also use a combination of the acceleration pedal 130 and the brake pedal 150 in order to negotiate the corner. The driving technique of using of the combination of the acceleration pedal 130 and the brake pedal 150 during a corner can be used, for example, to drift the vehicle 100

Utilizing the acceleration pedal 130 through a corner can cause the drive wheels (e.g., front wheels in a front-wheel drive vehicle or rear wheels in a rear wheel drive vehicle) of the vehicle 100 and/or the rolling wheels of the vehicle to slip. When slip occurs during a turn, the direction to which the wheel is pointed and a direction of actual travel are different. The angle between a wheel's actual direction of travel and the direction towards which the wheel is pointed is the slip angle of the wheel. This may also be referred to as lateral slip. Additionally, when slip occurs during a turn, the rotational speed of the wheel may be different that the free rolling speed of a wheel. In other words, the wheels may be spinning faster than the wheels are moving the vehicle 100. This may also be referred to as longitudinal slip.

Figure 2:
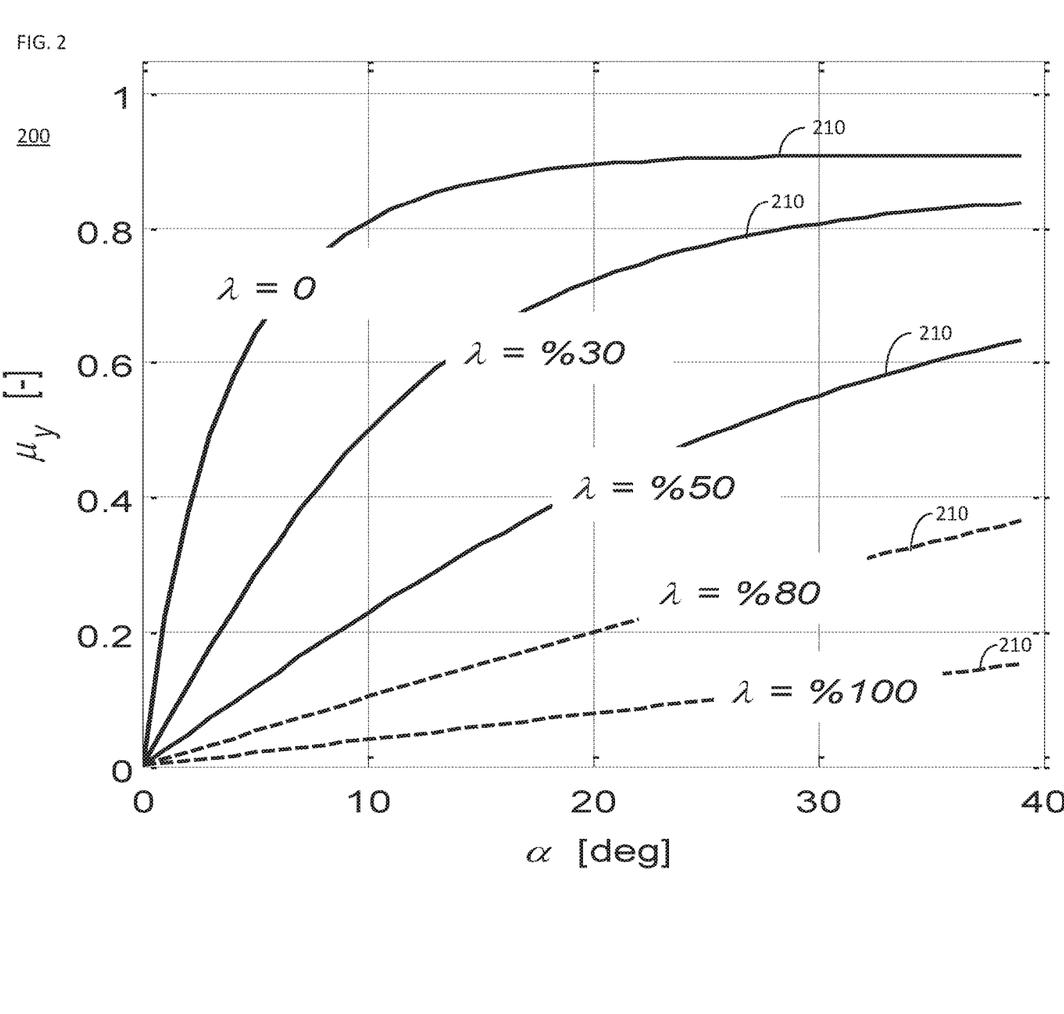
FIG. 2 is a graph of an exemplary non-linear combined lateral slip model, in accordance with an embodiment.

The processor 180 of the CSBDCI 170 utilizes non-linear slip models which combines the lateral slip with the longitudinal slip to more accurately predict how the driver wants the vehicle to react relative to the driver's input (i.e., the steering wheel angle, the accelerator pedal position and the brake pedal position). FIG. 2 is a graph of an exemplary non-linear combined lateral slip model 200, in accordance with an embodiment. In FIG. 2, $\mu_y$ on the vertical axis corresponds to a normalized lateral on a tire and $\alpha$ on the horizontal axis represents the slip angle in degrees. Normalized lateral force is the lateral force at each tire divided (normalized) by the vertical force at each tire. Each line 210 on the graph represents a different longitudinal slip ratio $\lambda$. The longitudinal slip ratio is the measure of the difference between the translational velocity of the wheel center (consequently the vehicle 100) and rotational speed of the wheel in percent. As seen in FIG. 2, as the slip ratio $\lambda$ increases, the lateral force on the tire $\mu_y$ decreases relative to the same slip angle $\alpha$.

Figure 3:
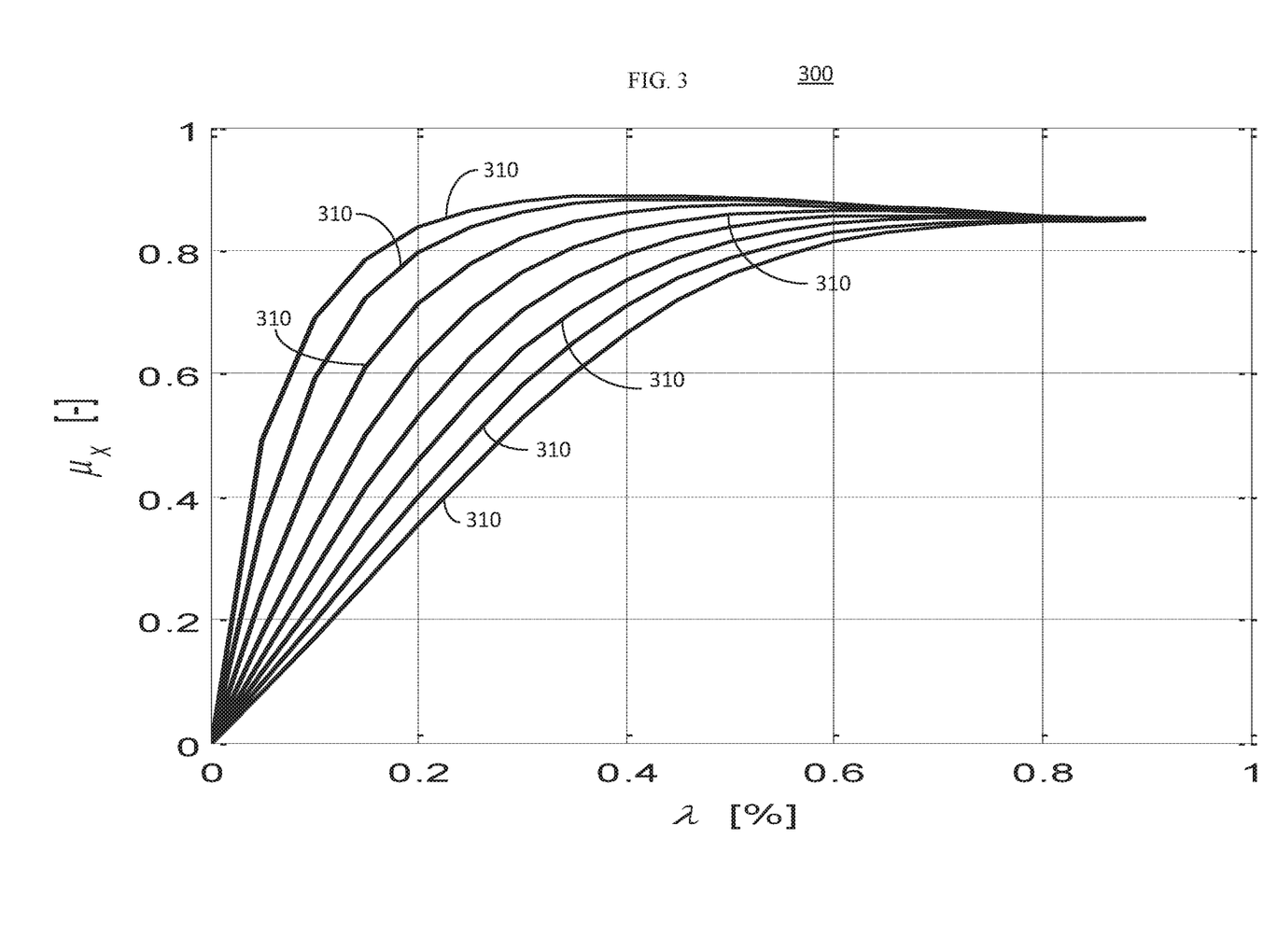
FIG. 3 is a graph of an exemplary non-linear combined longitudinal slip model, in accordance with an embodiment.

FIG. 3 is a graph of an exemplary non-linear combined longitudinal slip model 300, in accordance with an embodiment. In FIG. 3, $\mu_x$ on the vertical axis corresponds to a normalized longitudinal force on a tire and $\lambda$ on the horizontal axis represents a longitudinal slip ratio. Normalized longitudinal force is the longitudinal force at each tire divided (normalized) by the vertical force at each tire. Each line 310 on the graph represents a different slip angle in degrees. As the slip angle $\alpha$ increases, the longitudinal force $\mu_x$ decreases relative to the same longitudinal slip ratio $\lambda$.

The combined lateral and longitudinal slip models may be stored in the memory 190. The combined lateral and longitudinal slip models may be generated based upon simulations, experiments in ideal conditions, or a combination thereof. Parameters of the combined slip models may be identified, for example, based on lateral and longitudinal responses of the vehicle 100 in real road experiments on a dry road and by using a nonlinear Least Square optimization method.

The processor 180 of the CSBDCI 170 utilizes the combined lateral and longitudinal slip models as well as longitudinal speed and the data from the steering wheel angle sensor 120, the acceleration pedal position sensor 140 and the brake pedal position sensor 160 and analyzes the data to interpret the driver's intent. In particular, the CSBDCI 170 can determine the drivers desired yaw rate and lateral velocity therefrom.

Figure 4:
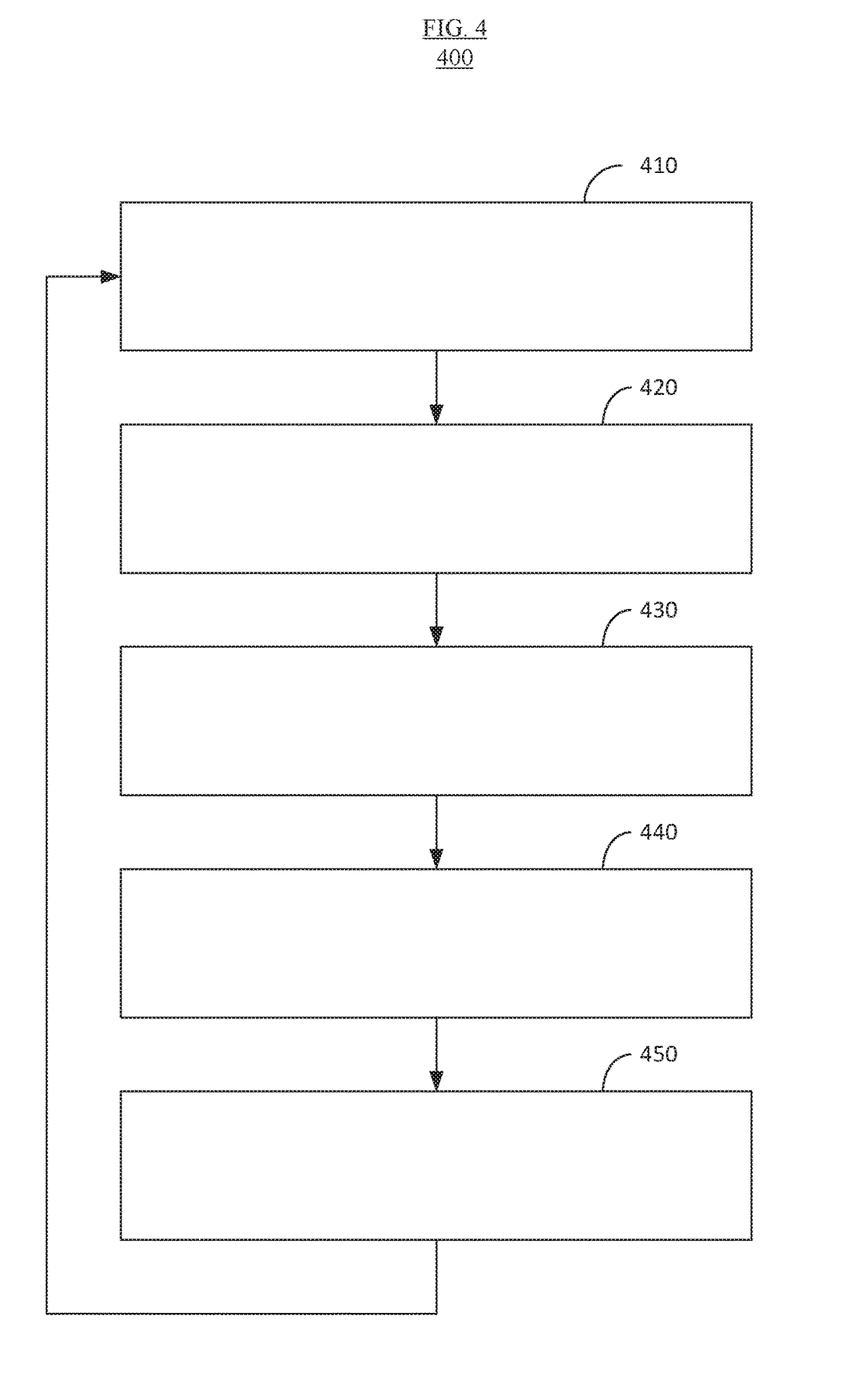
FIG. 4 is a flow diagram illustrating a method for how a combined slip-based driver command interpreter determines a driver's intent, in accordance with an embodiment.

FIG. 4 is a flow diagram illustrating a method 400 for how the CSBDCI 170 determines a driver's intent, in accordance with an embodiment. The processor 180 of the CSBDCI 170 first receives data from a vehicle's longitudinal speed sensor (e.g., the GPS, a speed estimator or the like), the steering wheel angle sensor 120, the acceleration pedal position sensor 140 and the brake pedal position sensor 160. (Step 410).

The processor 180 then determines, for each tire, a desired lateral force on the tire and a desired longitudinal force on the tire based upon the data received from the steering wheel angle sensor 120, the acceleration pedal position sensor 140 and the brake pedal position sensor 160 and the combined longitudinal and combined lateral slip models stored in the memory 190. (Step 420). In other words, the processor 180 determines, for each tire, which line 210 on the lateral slip model 200 and which line 310 on the longitudinal slip model 300 corresponds to the intent of the user based upon the determined steering wheel angle, the determined brake pedal position and the determined accelerator pedal position. The processor 180 determines the slip angle and slip ratio the driver intends to have based upon the determined steering wheel angle, the determined brake pedal position and the determined accelerator pedal position. Accordingly, the processor 180 can determine the desired lateral force on the tire and a desired longitudinal force on the tire by reading off the corresponding $\mu_y$ on the combined lateral slip model 200 and the $\mu_x$ on the combined longitudinal slip model 300. While the combined lateral slip model 200 and combined longitudinal slip model 300 are illustrated as being graphs, the combined lateral slip model 200 and combined longitudinal slip model 300 can be implemented in a variety of ways. For example, the combined lateral slip model 200 and combined longitudinal slip model 300 can be implemented as look-up tables, or the like. Wheel speeds are determined based on the wheel dynamics equation $T_{tr} - T_{br} - R_e \mu_x F_z = I_W \dot{\omega}$ at each corner where $T_{br}$, $T_{tr}$ are brake and traction torques interpreted from the accelerator and brake pedal positions, $R_e$ is the tire effective rolling radius, $F_z$ is the vertical force, $\mu_x$ is the expected normalized longitudinal force curves 310 from the combined-slip model 300, and $I_w$ is the wheel's moment of inertia. Therefore, slip ratio at each tire is obtained based on the calculated wheel speed from the wheel dynamics and the estimated (or measured) longitudinal speed. The calculated slip ratio, steering wheel data, normal forces, and longitudinal speed are then used in the lateral dynamics module, to determine the expected normalized lateral tire force curves 210 from the combined-slip model 200, and consequently the vehicle lateral response as described in further detail below.

The processor 180 then determines the desired lateral velocity (step 430) and the desired yaw rate (Step 440) for the vehicle. The desired lateral velocity $V_y$ can be determined according to equation 1:

$$\dot{V}_y = \frac{1}{m}\sum_{i=1}^{4}(f_{xi}\sin(\delta_{si}) + f_{yi}\cos(\delta_{si})) - \dot{\psi}V_x \quad \text{Equation 1}$$

Where each i represent a tire, $f_{xi}$ represents the longitudinal force at each tire i obtained from $f_{xi}=\mu_{xi}F_{zi}$, $f_{yi}$ represents the lateral force at each tire i obtained from $f_{yi}=\mu_{yi}F_{zi}$, and $\delta_{si}$ is the steering angle for each tire i relative to the direction the car is pointing, $V_x$ is the vehicle longitudinal speed and $\dot{\psi}$ is the desired yaw rate obtained by solving Equation 2 discussed below.

Figure 5:
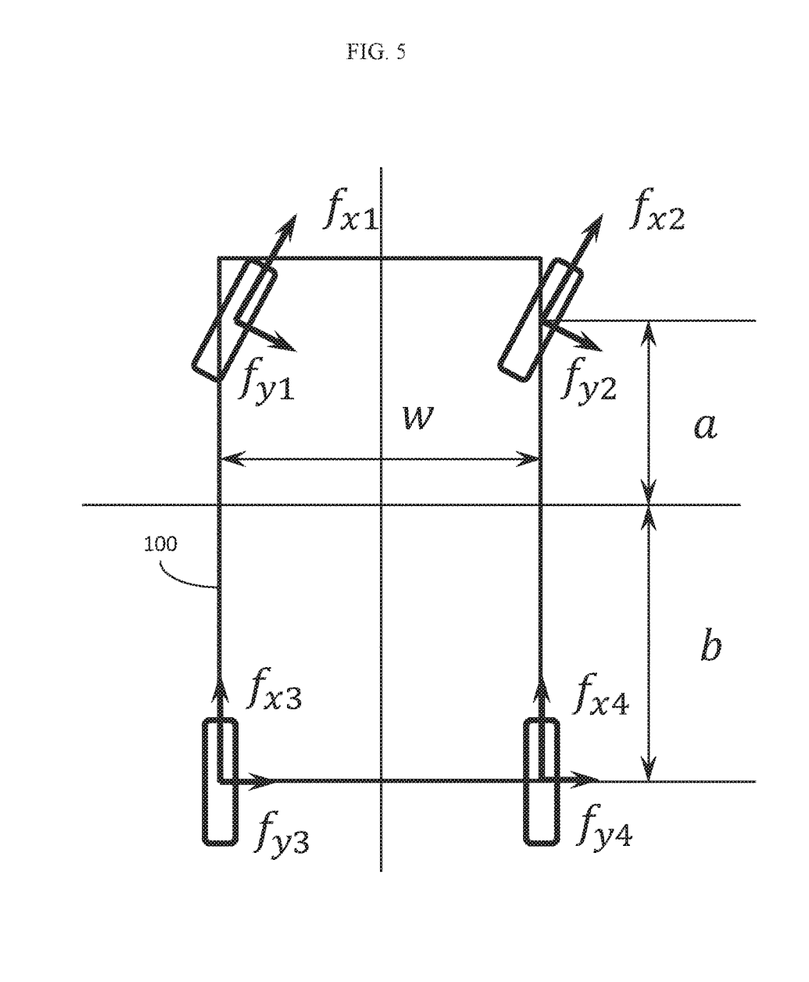
FIG. 5 is an illustration of a vehicle and the forces the vehicle experiences, in accordance with an embodiment.

FIG. 5 is an illustration of a vehicle 100 and the forces the vehicle 100 experiences, in accordance with an embodiment. The tires of the vehicle 100 may be experiencing lateral slip and, possible, longitudinal slip in this example. As seen in FIG. 5, the forces $f_{xi}$ and $f_{yi}$ are relative to the orientation of the tire rather than the vehicle 100.

The processor may determine the driver's desired yaw rate $\dot{\psi}$ according to equation 2:

$$I_z\dot{\psi} = a\sum_{i=1,2}(f_{xi}\sin(\delta_{si}) + f_{yi}\cos(\delta_{si})) - \quad \text{Equation 2}$$

$$b\sum_{i=3,4}(f_{xi}\sin(\delta_{si}) + f_{yi}\cos(\delta_{si})) +$$

$$\frac{w}{2}\sum_{1,3}(f_{xi}\cos(\delta_{si}) - f_{yi}\sin(\delta_{si})) -$$

$$\frac{w}{2}\sum_{2,4}(f_{xi}\cos(\delta_{si}) - f_{yi}\sin(\delta_{si}))$$

Where a is the distance between the center of gravity and a front axle of the vehicle 100, b is the distance between the center of gravity and a rear axle of the vehicle 100 and w is the width of the vehicle. The other variables are equivalent to those in Equation 1. This equation is based upon the tire number assignment illustrated in FIG. 5. However, the equation could vary if tires were assigned in a different order.

By utilizing the non-linear combined lateral slip model 200 and the non-linear combined longitudinal slip model 300, the CSBDCI 170 can better predict the driver's intent, particularly the intended lateral velocity and yaw rate for the vehicle 100.

The processor 180, or another processor of the vehicle can then execute a control command based upon the determined lateral velocity and yaw rate. (Step 450). For example, the determined lateral velocity and yaw rate may be utilized by, for example, an electronic stability control system (not illustrated) which may activate one or more of an steering system, braking system or acceleration system to maintain stable control of the vehicle. One advantage of utilizing the CSBDCI 170 is that the CSBDCI 170 can more accurately determine a driver's intent, particularly in performance vehicles, allowing the driver to drive the vehicle 100 closer to the physical limits of the vehicle 100 before another system, such as the electronic stability control system, takes over command of the vehicle. In other words, usually when the driver is pushing the vehicle to the limit handling, the driver would turn off the stability control. Accordingly, by better interpreting when a driver is intending to cause slip, the system allows the driver to push the vehicle into the limit while keeping stability control on, thereby allowing the driver to keep the vehicle at that limit and make sure the vehicle remains stable too.

The processor 180 then returns to step 410 to determine the driver's next intent. The control cycle may be performed quickly, for example, every 0.01 seconds. However, the control cycle speed can vary depending upon the speed of the processor 180 and other components of the system.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A vehicle, comprising:
   a plurality of tires;
   a steering wheel configured to steer the vehicle;
   a steering wheel angle sensor configured to output an angle of the steering wheel;
   an acceleration pedal configured to control a fuel supply rate of the vehicle;
   an acceleration pedal position sensor configured to output a position of the acceleration pedal;
   a brake pedal configured to control braking of the vehicle;
   a brake pedal position sensor configured to output a position of the brake pedal; and
   a combined slip based driver command interpreter communicatively coupled to the steering wheel angle sensor, the acceleration pedal position sensor and the brake pedal position sensor, the combined slip based driver command interpreter comprising:
      a memory configured to store a non-linear combined lateral slip model and a non-linear combined longitudinal slip model; and
      a processor, the processor configured to determine a driver's intended vehicle lateral velocity and a driver's intended vehicle yaw rate based upon the angle of the steering wheel, the position of the acceleration pedal, the position of the brake pedal, a longitudinal velocity of the vehicle, the non-linear combined lateral slip model and the non-linear combined longitudinal slip model;

wherein the processor is further configured to:
  determine an intended lateral force on each tire of the vehicle and an intended longitudinal force on each tire of the vehicle based upon the non-linear combined lateral slip model and the non-linear combined longitudinal slip model;
  determine the driver's intended vehicle lateral velocity and the driver's intended vehicle yaw rate based upon the determined intended lateral force on each tire of the vehicle, the determined intended longitudinal force on each tire of the vehicle, and a steering angle for each tire of the vehicle; and
  execute a control command for an electronic stability control system to take over command of the vehicle by automatically activating steering, braking, or acceleration of the vehicle based on the determined driver's intended lateral velocity and the determined driver's intended vehicle yaw rate.

2. The vehicle of claim 1, the processor is further configured to determine the intended lateral force on each tire of the vehicle and the intended longitudinal force on each tire of the vehicle based upon the non-linear combined lateral slip model and the non-linear combined longitudinal slip model.

3. The vehicle of claim 2, wherein the processor utilizes the non-linear combined lateral slip model to convert the angle of the steering wheel, the position of the acceleration pedal and the position of the brake pedal into the intended lateral force on each tire.

4. The vehicle of claim 3, wherein the processor utilizes the non-linear combined longitudinal slip model to convert the angle of the steering wheel, the position of the acceleration pedal and the position of the brake pedal into the intended longitudinal force on each tire.

5. The vehicle of claim 4, where the processor is configured to determine the intended vehicle lateral velocity according to:

$$\dot{V}_y = \frac{1}{m}\sum_{i=1}^{4}(f_{xi}\sin(\delta_{si}) + f_{yi}\cos(\delta_{si})) - \dot{\psi}V_x$$

where Vy is the intended vehicle lateral velocity $V_x$, is the vehicle longitudinal speed, i corresponds to each tire of the vehicle, $f_{xi}$ represents the determined intended longitudinal force at each tire i, $f_{yi}$ represents the determined intended lateral force of each tire i, and $\delta_{si}$ is the steering angle for each tire.

6. The vehicle of claim 5, where the processor is configured to determine the intended vehicle yaw rate according to:

$$I_z\dot{\psi} = a\sum_{i=1,2}(f_{xi}\sin(\delta_{si}) + f_{yi}\cos(\delta_{si})) - b\sum_{i=3,4}(f_{xi}\sin(\delta_{si}) + f_{yi}\cos(\delta_{si})) + \frac{w}{2}\sum_{1,3}(f_{xi}\cos(\delta_{si}) - f_{yi}\sin(\delta_{si})) - \frac{w}{2}\sum_{2,4}(f_{xi}\cos(\delta_{si}) - f_{yi}\sin(\delta_{si}))$$

where ψ is the intended yaw rate, a is the distance between a center of gravity and a front axle of the vehicle, b is the distance between the center of gravity and a rear axle of the vehicle and w is the rear axle width.

7. A method for operating a combined slip based driver command interpreter for a vehicle having a plurality of tires, comprising:
  receiving, by a processor of the combined slip based driver command interpreter, a steering wheel angle of a steering wheel of the vehicle, a position of a brake pedal of the vehicle and a position of an acceleration pedal of the vehicle;
  determining, by the processor, an intended lateral force on each tire of the vehicle and an intended longitudinal force on each tire of the vehicle based upon the non-linear combined lateral slip model and the non-linear combined longitudinal slip model;
  determining, by the processor, a driver's intended vehicle lateral velocity and a driver's intended vehicle yaw rate based upon the angle of the steering wheel, the position of the acceleration pedal, the position of the brake pedal, a non-linear combined lateral slip model and a non-linear combined longitudinal slip model, wherein the driver's intended vehicle lateral velocity and the driver's intended vehicle yaw rate are determined by the processor based upon the determined intended lateral force on each tire of the vehicle, the determined intended longitudinal force on each tire of the vehicle, and a steering angle for each tire of the vehicle; and
  executing, via the processor, a control command for an electronic stability control system to take over command of the vehicle by automatically activating steering, braking, or acceleration of the vehicle based on the determined driver's intended lateral velocity and the determined driver's intended vehicle yaw rate.

8. The method of claim 7 wherein the method further comprising determining the intended lateral force on each tire of the vehicle and the intended longitudinal force on each tire of the vehicle based upon the non-linear combined lateral slip model and the non-linear combined longitudinal slip model.

9. The method of claim 8, wherein the processor utilizes the non-linear combined lateral slip model to convert the angle of the steering wheel, the position of the acceleration pedal and the position of the brake pedal into the intended lateral force on each tire.

10. The method of claim 9, wherein the processor utilizes the non-linear combined longitudinal slip model to convert the angle of the steering wheel, the position of the acceleration pedal and the position of the brake pedal into the intended longitudinal force on each tire.

11. The method of claim 10, further comprising determining the intended vehicle lateral velocity according to:

$$\dot{V}_y = \frac{1}{m}\sum_{i=1}^{4}(f_{xi}\sin(\delta_{si}) + f_{yi}\cos(\delta_{si})) - \dot{\psi}V_x$$

where Vy is the intended vehicle lateral velocity, i corresponds to each tire of the vehicle, $f_{xi}$, represents the determined intended longitudinal force at each tire i, $f_{yi}$ represents the determined intended lateral force of each tire i, and $\delta_{si}$ is the steering angle for each tire.

12. The method of claim 11, further comprising determining the intended vehicle yaw rate according to:

$$I_z\dot{\psi} = a\sum_{i=1,2}(f_{xi}\sin(\delta_{si}) + f_{yi}\cos(\delta_{si})) - b\sum_{i=3,4}(f_{xi}\sin(\delta_{si}) + f_{yi}\cos(\delta_{si})) +$$

-continued
$$\frac{w}{2}\sum_{1,3}(f_{xi}\cos(\delta_{si}) - f_{yi}\sin(\delta_{si})) - \frac{w}{2}\sum_{2,4}(f_{xi}\cos(\delta_{si}) - f_{yi}\sin(\delta_{si}))$$

where $\psi$ is the intended yaw rate, a is the distance between a center of gravity and a front axle of the vehicle, b is the distance between the center of gravity and a rear axle of the vehicle and w is the rear axle width.

13. A combined slip based driver command interpreter for a vehicle having a plurality of tires, comprising:
   a memory configured to store a non-linear combined lateral slip model and a non-linear combined longitudinal slip model; and
   a processor communicatively coupled to the memory, the processor configured to:
   receive a steering wheel angle from a steering wheel angle sensor, an acceleration pedal position from an acceleration pedal position sensor and a brake pedal position from a brake pedal position sensor; and
   determine a driver's intended vehicle lateral velocity and a driver's intended vehicle yaw rate based upon the angle of the steering wheel, the position of the acceleration pedal, the position of the brake pedal, the non-linear combined lateral slip model and the non-linear combined longitudinal slip model;
   wherein the processor is further configured to:
      determine an intended lateral force on each tire of the vehicle and an intended longitudinal force on each tire of the vehicle based upon the non-linear combined lateral slip model and the non-linear combined longitudinal slip model;
      determine the driver's intended vehicle lateral velocity and the driver's intended vehicle yaw rate based upon the determined intended lateral force on each tire of the vehicle, the determined intended longitudinal force on each tire of the vehicle, and a steering angle for each tire of the vehicle; and
      execute a control command for an electronic stability control system to take over command of the vehicle by automatically activating steering, braking, or acceleration of the vehicle based on the determined driver's intended lateral velocity and the determined driver's intended vehicle yaw rate.

14. The combined slip based driver command interpreter of claim 13, wherein the processor is further configured to determine the intended lateral force on each tire of the vehicle and the intended longitudinal force on each tire of the vehicle based upon the non-linear combined lateral slip model and the non-linear combined longitudinal slip model.

15. The combined slip based driver command interpreter of claim 14, wherein processor utilizes the non-linear combined lateral slip model to convert the angle of the steering wheel, the position of the acceleration pedal and the position of the brake pedal into the intended lateral force on each tire and utilizes the non-linear combined longitudinal slip model to convert the angle of the steering wheel, the position of the acceleration pedal and the position of the brake pedal into the intended longitudinal force on each tire.

16. The combined slip based driver command interpreter of claim 15, where the processor is configured to determine the intended vehicle lateral velocity according to:

$$\dot{V}_y = \frac{1}{m}\sum_{i=1}^{4}(f_{xi}\sin(\delta_{si}) + f_{yi}\cos(\delta_{si})) - \psi V_x$$

where Vy is the intended vehicle lateral velocity, i corresponds to each tire of the vehicle, $f_{xi}$, represents the determined intended longitudinal force at each tire i, $f_{yi}$ represents the determined intended lateral force of each tire i, and $\delta_{si}$ is the steering angle for each tire.

17. The combined slip based driver command interpreter of claim 16, where the processor is configured to determine the intended vehicle yaw rate according to:

$$I_z\dot{\psi} = a\sum_{i=1,2}(f_{xi}\sin(\delta_{si}) + f_{yi}\cos(\delta_{si})) - b\sum_{i=3,4}(f_{xi}\sin(\delta_{si}) + f_{yi}\cos(\delta_{si})) +$$
$$\frac{w}{2}\sum_{1,3}(f_{xi}\cos(\delta_{si}) - f_{yi}\sin(\delta_{si})) - \frac{w}{2}\sum_{2,4}(f_{xi}\cos(\delta_{si}) - f_{yi}\sin(\delta_{si}))$$

where $\psi$ is the intended yaw rate, a is the distance between a center of gravity and a front axle of the vehicle, b is the distance between the center of gravity and a rear axle of the vehicle and w is the rear axle width.

18. The vehicle of claim 1, wherein the processor is configured to execute the control command for the electronic stability control system to take over command of the vehicle by automatically activating a steering system of the vehicle based on the determined driver's intended lateral velocity and the determined driver's intended vehicle yaw rate.

19. The vehicle of claim 1, wherein the processor is configured to execute the control command for the electronic stability control system to take over command of the vehicle by automatically activating a braking system of the vehicle based on the determined driver's intended lateral velocity and the determined driver's intended vehicle yaw rate.

20. The vehicle of claim 1, wherein the processor is configured to execute the control command for the electronic stability control system to take over command of the vehicle by automatically activating an acceleration system of the vehicle based on the determined driver's intended lateral velocity and the determined driver's intended vehicle yaw rate.

* * * * *